United States Patent [19]

Rathi et al.

[11] Patent Number: 4,976,936
[45] Date of Patent: Dec. 11, 1990

[54] FLUE GAS DESULFURIZATION WITH OXIDATION OF CALCIUM SULFITE IN FGD DISCHARGES

[75] Inventors: Ronald J. Rathi, Pittsburgh; Lewis B. Benson, Coraopolis, both of Pa.

[73] Assignee: Dravo Lime Company, Pittsburgh, Pa.

[21] Appl. No.: 395,667

[22] Filed: Aug. 18, 1989

[51] Int. Cl.$^5$ .................. C01B 17/00; C01F 11/46
[52] U.S. Cl. ......................... 423/242; 423/555
[58] Field of Search .......... 423/242 A, 242 R, 244 A, 423/244, 535

[56] References Cited

U.S. PATENT DOCUMENTS

| | | | |
|---|---|---|---|
| 2,080,779 | 5/1937 | Lessing | 23/2 |
| 2,090,142 | 8/1937 | Nonhebel et al. | 23/2 |
| 3,840,638 | 10/1974 | Morita et al. | 423/166 |
| 3,919,393 | 2/1975 | Selmeczi | 423/242 |
| 3,919,394 | 2/1975 | Selmeczi | 423/242 |
| 3,961,021 | 6/1976 | Morita et al. | 423/242 |
| 3,965,242 | 6/1976 | Morita et al. | 423/242 |
| 3,985,860 | 10/1976 | Maudelik et al. | 423/242 |
| 4,046,856 | 9/1977 | Itoo et al. | 423/242 |
| 4,164,549 | 8/1979 | Selmeczi | 423/242 |
| 4,166,838 | 9/1979 | Tatani et al. | 423/242 |
| 4,374,812 | 2/1983 | Atsukawa et al. | 423/242 |
| 4,696,805 | 9/1987 | Shinoda et al. | 423/242 |

*Primary Examiner*—Gregory A. Heller
*Attorney, Agent, or Firm*—Parmelee, Miller, Welsh & Kratz

[57] ABSTRACT

A method for removing sulfur dioxide from flue gases, with oxidation of calcium sulfite in the discharge from a liquid scrubbing system to produce gypsum, oxidizes the sulfite in a thickener overflow at a pH of between 4.0 and 6.5. The calcium sulfite is oxidized to a calcium sulfate which precipitates from the aqueous media and is separated, while the acidic aqueous media is recycled to an acidification step preceding the oxidation. A further minor portion of scrubber slurry may be discharged from the liquid scrubber unit at a pH of 4.5 to 6.0 and also treated with acid, oxidized, and the resultant gypsum separated.

12 Claims, 2 Drawing Sheets

FLUE GAS DESULFURIZATION WITH OXIDATION OF CALCIUM SULFITE IN FGD DISCHARGES

BACKGROUND OF THE INVENTION

This invention relates to a method of removing sulfur dioxide from flue gases and oxidizing calcium sulfite in the discharge from a flue gas desulfurization (FGD) process.

In some commercial wet FGD processes, sulfur dioxide-containing flue gases are contacted with aqueous slurries containing mainly calcium hydroxide, and optionally up to about six weight percent magnesium hydroxide, in a scrubbing tower where the sulfur dioxide is removed from the gases as calcium sulfite and calcium sulfate in the slurries. In some processes, slurries are recirculated around the scrubbing tower with at least a minor portion of the slurries being first diverted to an oxidation step. In this oxidation step, the calcium sulfite and calcium hydrogen sulfite are oxidized to form additional calcium sulfate in an aqueous solution. The calcium sulfate is separated from the aqueous solution and recovered as gypsum and the aqueous solution is recirculated to the scrubbing tower. The solution recirculated from the oxidation step usually contains sulfate ions which react with calcium from calcium hydroxide in the scrubbing tower to form additional calcium sulfate. U.S. Pat. Nos. 2,080,779 and 4,046,856 generally disclose such wet FGD processes.

As the technical and patent literature indicate, calcium sulfite and calcium sulfate processes and products are very difficult to handle because of their rheological properties, and they tend to clog and corrode the equipment and interconnecting piping. Thus the close integration of the scrubbing and oxidation steps complicates the efficient operation of the scrubbing towers. In addition, poor quality calcium sulfate crystals are formed under the general operating conditions in scrubbing towers.

In a modified commercial FGD process designed to facilitate the operation of the scrubbing tower, the scrubber slurry from the scrubbing tower is first separated in a thickener to remove insoluble calcium sulfite and other solids before it is recirculated. The thickener underflow is then discharged as a waste product in the form of a sludge or filter cake. This waste product raises environmental concerns. Thus it has been suggested that the waste product might be converted to a marketable gypsum by-product by oxidizing the calcium sulfite to calcium sulfate.

It is an object of the present invention to provide an improved method for removal of sulfur dioxide from flue gases where discharged sludge is oxidized to produce marketable gypsum.

SUMMARY OF THE INVENTION

According to the practices of the present invention, high commercial quality gypsum is recovered from calcium sulfite-containing sludges separated in a thickener or other settling device from a recirculating scrubbing slurry of a flue gas desulfurization system. The slurry from the scrubbing tower is thickened or similarly processed to separate undissolved calcium sulfite, in a sludge or other discharge containing at least about 20 weight percent total solids, from the slurry. The discharge is acidified with sulfuric acid or other suitable aqueous acid to cause dissolution of calcium sulfite, in an aqueous solution having a pH of between about 4.0 to 6.5, which may contain undissolved calcium sulfate and other solids. The calcium sulfite is then oxidized with air or another oxygen source to precipitate calcium sulfate from an aqueous solution. The calcium sulfate precipitate is separated as gypsum from the solution by known means. The aqueous solution is preferably recycled to cause dissolution of calcium sulfite in the discharge separated from the scrubbing slurry.

In another embodiment of the present method, in addition to the treatment of the portion of the slurry removed after passage through the liquid scrubber unit, a further minor portion of slurry in the liquid scrubber is discharged therefrom at a pH of between 4.5 to 6.0 and this further minor portion contacted with acid and oxidized also. The further minor portion is about one-quarter to one-third of the total discharge from the scrubbing system that is acidified and oxidized according to the present method.

DESCRIPTION OF THE DRAWINGS

The invention will become more readily apparent from the following description of preferred embodiments thereof shown, by way of example only, in the accompanying drawings, wherein.

DETAILED DESCRIPTION

In the present invention, a scrubbing slurry formed from calcium hydroxide and magnesium hydroxide, and which contains magnesium hydroxide present in an amount to provide an effective magnesium ion content in a scrubbing tower of between 2500 to 9000 parts per million, is passed through a scrubbing system for removing sulfur dioxide from flue gases. As is known in the art, the effective amount of magnesium ion in such scrubbing solutions is that amount over and above the chloride ion content of the aqueous medium present in the scrubbing unit. Since chloride ions tend to interfere with the effect of magnesium ions present in the scrubbing solution, only those magnesium ions over and above the chloride ions present in the scrubbing unit are considered to be "effective" in the removal of sulfur dioxide from the flue gas.

Figure 1:
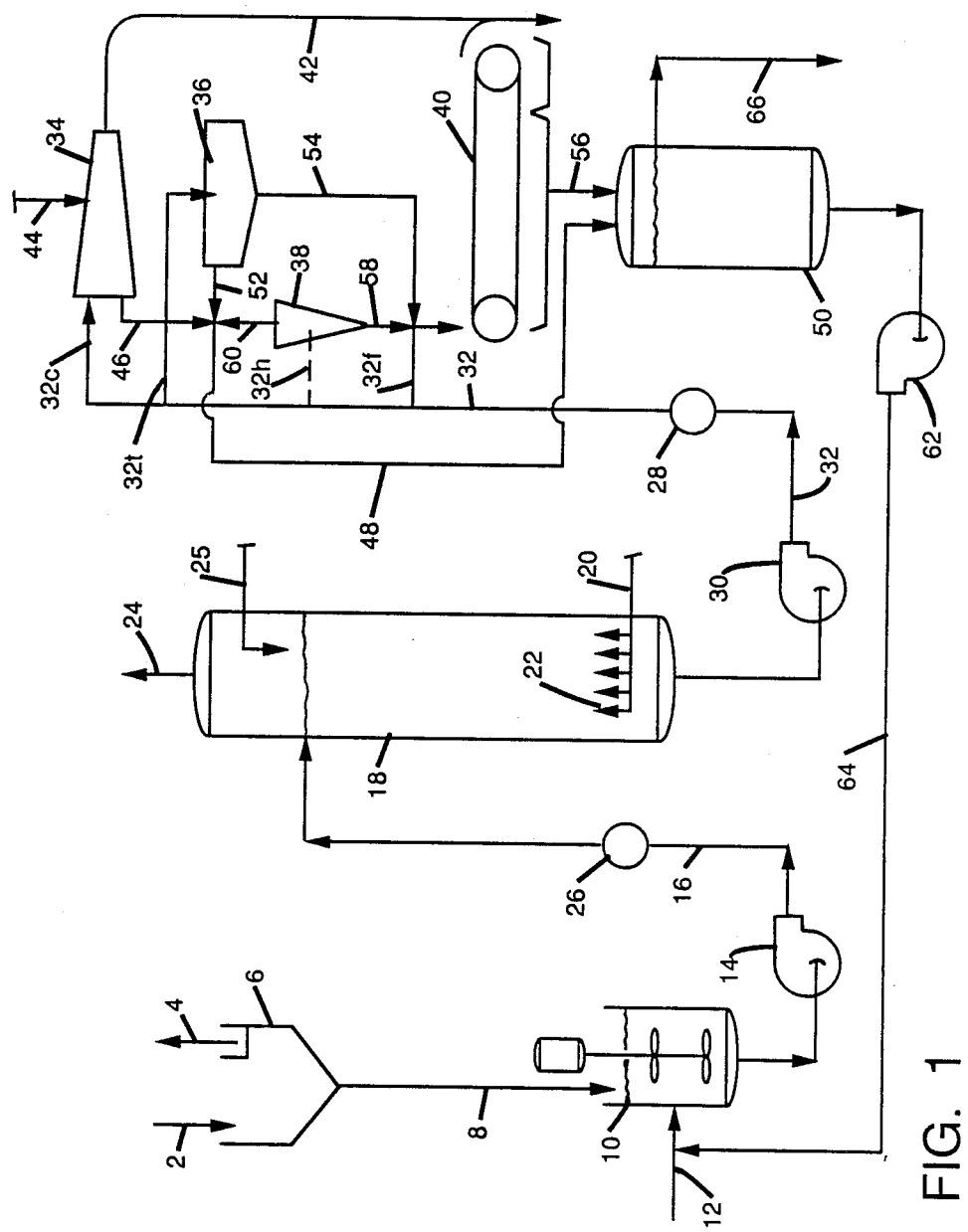
FIG. 1 is a flow diagram illustrating a presently preferred method of the present invention.

Referring now to FIG. 1, at least a portion of a sulfur dioxide scrubbing slurry, after passage through a scrubber, is recirculated through lines 2 and 4 between a scrubbing tower (not shown) and a thickener 6. In the thickener 6, an aqueous sludge 8, containing about 20 to 30 weight percent solids and 70 to 80 percent water is separated from the aqueous slurry. The solids content of the removed sludge contains mostly, i.e. 80 to 90 weight percent, calcium sulfite, with the remainder of the solids comprising calcium sulfate, calcium hydroxide, fly ash or other solids. The aqueous portion of the sludge may also contain dissolved magnesium, sodium, calcium, chloride and sulfate ions.

The removed aqueous sludge 8 is discharged continuously or batchwise from the thickener 6 to a mixing tank 10, and may optionally be filtered prior to charging to the mixing tank 10 and charged thereto as a filter cake containing about 25 to 50 weight percent solids.

Fresh and, when employed, recycle sulfuric or other aqueous acid is added through line 12 to the discharge in the mixing tank 10 to cause dissolution of most of the calcium sulfite present in the aqueous sludge. Preferably the pH of the solution in the mixing tank 10 is at least about 4.0 because noticeable amounts of sulfur dioxide are given off below this pH. Preferably the pH of the aqueous solution is maintained between about 4.0 and 6.5 to minimize acid consumption in a subsequent oxidation step. Most preferably, the pH is controlled to provide a pH of between 5.2 to 5.5 which will provide for preferred crystal size formation, no gaseous sulfur dioxide release, and easy operation with about 99 percent oxidation in the following step of the process. In a particularly preferred practice, the calcium sulfite is dissolved in mixing tank 10 during a nominal residence time of 0.5 to 1.5 hours with about 20 to 100 pounds of recycle solution, from the subsequent oxidation step, per pound of calcium sulfite hemihydrate, and sufficient fresh sulfuric acid so that the calcium sulfite is contacted with acid in a mole ratio of about 0.1 to 0.5 acid to calcium sulfite. The solution in the mixing tank 10, with addition of the acid, typically contains between 6 and 25 weight percent solids and usually between 8 and 12 weight percent solids.

The aqueous solution formed in the mixing tank 10 is pumped, such as by a centrifugal pump 14, through line 16 to an oxidizing tower 18 for oxidation of the dissolved calcium sulfite with air to form a calcium sulfate precipitate in the acidic solution. The oxidizing tower 18 may be a simple vertical tower as shown or other suitable design. In the oxidizing tower, forced air, from a source not shown, is fed through line 20 and injected through jets 22 disposed in the bottom of the oxidizing tower 18. The injected air bubbles upwardly through the solution and out of the oxidizing tower 18 through an off gas header 24. Additional acid is provided to the oxidizing tower 18 through acid line 25 to maintain the pH of the solution in the tower 18 at a desired level previously defined herein, and to dissolve additional calcium sulfite solids which are carried from the mixing tank 10. In-line pH analyzers 26, 28 on the liquid outlet line 16 from the mixing tank 10 and line 32 from the oxidizing tower 18, may be used to control the addition of acid.

The aqueous media in the oxidizing tower 18, containing precipitated calcium sulfate produced through oxidation of calcium sulfite, is pumped from the oxidizing tower 18, such as by a centrifugal pump 30, through line 32 and charged to an appropriate separating means such as a centrifuge 34, a thickener 36, a hydrocyclone 38 or a belt filter 40 for separating the calcium sulfate precipitate from the aqueous media. If the aqueous media and precipitated calcium sulfate from line 32 are charged through line 32c to a centrifuge 34, the solids content thereof can be concentrated to a level that enables direct discharge of the concentrated solids from the system through line 42, a level of about 90 weight percent solids. Wash water may be fed to the centrifuge through line 44, with separated aqueous liquid from the centrifuge 34 discharged through line 46 to a line 48 which passes the same to a holding tank 50.

Optionally, if the aqueous media and precipitated calcium sulfate from line 32 are charged through line 32t to a thickener 36, a concentration to a solids content of about 40 weight percent only, is practicable, with overflow liquid passing through line 52 to line 48 to holding tank 50, while the underflow or concentrated slurry is discharged from the thickener 36 through line 54. The underflow from thickener 36 may then be filtered, such as by use of the belt filter 40 to concentrate the same further, with the concentrated solids, or filter cake, preferably with less than about 10 percent moisture, discharged through line 42 from the system, while the separated liquid or filtrate may be fed to the holding tank 50 through line 56.

Or, optionally, if the aqueous media and precipitated calcium sulfate from line 32 are charged through line 32h to a hydrocyclone 38, the concentrated solids from the hydrocyclone 38 are passed through line 58 to the filter 40, with filtrate from the filter 40 passing through line 56 to holding tank 50 while the concentrated filter cake is discharged through line 42. The aqueous media separated in hydrocyclone 39 is fed through line 60 to line 48 for charging to holding tank 50.

Or, the aqueous media and precipitated calcium sulfate from line 32 may be passed from line 32 through line 32f directly to a filter 40, with the filtrate passed through line 56 to holding tank 50 while concentrated filter cake is discharged from the system through line 42.

The aqueous media from the desired separating means, centrifuge 34, thickener 36, hydrocyclone 38 or belt filter 40 is passed to the holding tank 50. Preferably, at least a portion of this separated aqueous media, which contains acid, is recycled by pump 62 through a recycle line 64 to the acid addition line 12 for further dissolution of calcium sulfite in the mixing tank 10. The remainder of the aqueous media from holding tank 50 is discharged through line 66 to a waste treatment facility. The aqueous media from the holding tank 50 is preferably not recycled to the scrubbing tower of the flue gas desulfurization system so that the chemistries of the scrubbing step and oxidation step will be essentially separate. In addition, the sulfate ions in the aqueous media from the holding tank would not react with the calcium hydroxide and magnesium hydroxide under scrubbing tower operating conditions and poor quality calcium crystals could result.

An advantage of the method described in FIG. 1 lies in the fact that the chemistries of the scrubbing step and oxidation step are essentially separate, which enables the use of the method as a retrofit to existing sulfur dioxide removal systems. Because of the separate features of the oxidation, the scrubbing system chemistry of an existing plant or the scrubbing system itself need not be altered, except for passage of aqueous sludge 8 from the thickener 6 to the mixing tank for oxidation treatment. Also, with the present oxidation system, the aqueous sludge 8 may be oxidized, or it may be otherwise disposed of, in the event that oxidation of the sludge is, at some time, impractical or undesirable. Thus, the chemistry of the oxidation system itself, being separated from the flue gas desulfurization system may be employed only when desired without interfering with the flue gas desulfurization system.

Figure 2:
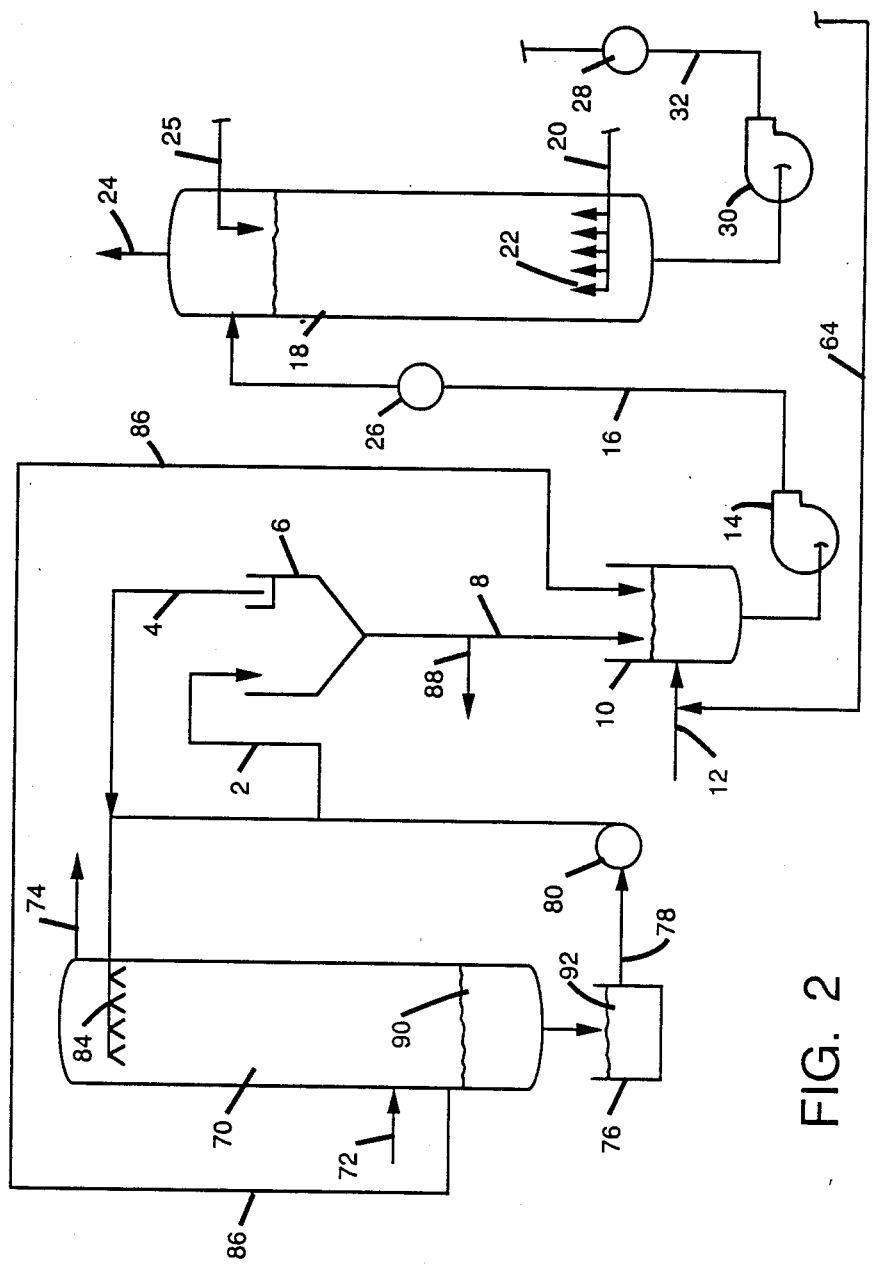
FIG. 2 is a flow diagram illustrating an alternative method of the present invention.

An alternate embodiment of the present method is schematically illustrated in FIG. 2. In FIG. 2, the components common to the method illustrated in FIG. 1 have the same numeric designations, with the separation system for separating the calcium sulfate from the aqueous media from line 32 not shown for the purpose of clarity. A liquid scrubber unit 70 is shown with flue gases containing sulfur dioxide fed thereto through line 72 and cleaned gases discharged therefrom through line 74. Effluent from the scrubbing unit is passed to a holding vessel 76, and a recycle line recycles effluent therefrom through line 78 to a pump 80 and then through return line 82 to injectors 84 in the liquid scrubbing unit 70. A discharge from line 82 to line 2 for flow to a dewatering tank 6 is shown, with return of overflow liquid to the return line 82 of the scrubber provided through line 4. In this embodiment, a minor portion of discharge from the liquid scrubbing unit 70 is directly treated, in addition to treatment of the liquid sludge from line 16 of mixing tank 10.

As illustrated, a portion of the aqueous scrubbing slurry in the liquid scrubbing unit 70, after contact with the flue gases but prior to passage to the holding vessel 76, is discharged through line 86 to mixing tank 10 in which this discharge is contacted with acid fed through line 12. After acidification to a pH of between about 4.0 to 6.5, the discharge from mixing tank 10 is charged to the oxidizing tower 18 through line 16 and oxidized therein and subsequently treated, as is the aqueous solution fed to the mixing tank 10 through line 8.

Since the scrubbing liquid 90 in the liquid scrubber unit 70 is at a pH of between about 4.5 to 6.0, preferably 5.5 to 6.0, less acid is required for acidification of this liquor than the liquor or scrubbing slurry 92 in holding vessel 76, which is generally at a pH of about 7.0. In order not to seriously interfere with the scrubbing chemistry in the liquid scrubbing unit 70, however, the discharged portion of the slurry removed through line 86 must be only a minor amount of the total discharge from the scrubbing system and preferably in an amount of about one-quarter to one-half of the total discharge from the scrubbing system, which total discharge includes the slurry discharged through line 2 and through line 86.

When discharge from both lines 2 and 86 are treated in the mixing tank 10, a portion of the discharge from line 8 may be removed through line 88 and treated in a distinct matter so as to retain the chemistry and flow rates desired in the system.

What is claimed is:

1. In a method of flue gas desulfurization wherein a flue gas, containing sulfur dioxide, is contacted in a liquid scrubber unit with an aqueous slurry formed from calcium hydroxide and magnesium hydroxide, and which contains magnesium hydroxide in an amount to provide an effective magnesium ion content of between 2500 to 9000 parts per million in the liquid scrubber unit, and at least a portion of the slurry, after passage through the scrubber, containing undissolved calcium sulfite is recirculated through a thickener to produce an aqueous sludge containing calcium sulfite, the improvement wherein the calcium sulfite present in the aqueous sludge is oxidized by:
    separating undissolved calcium sulfite, in a sludge which contains at least about 20 weight percent solids, from the scrubbing slurry;
    contacting said sludge with sulfuric acid to cause dissolution of calcium sulfite in an aqueous solution;
    oxidizing the dissolved calcium sulfite in the aqueous solution with an oxygen-containing gas to form a calcium sulfate precipitate in an aqueous media;
    separating the calcium sulfate precipitate from the aqueous media; and
    returning aqueous media, separated from the calcium sulfate precipitate, for contact with additional sludge produced in the thickener.

2. The method of claim 1 wherein dissolution of calcium sulfite is caused by sulfuric acid in an aqueous solution having a pH of at least about 4.0.

3. A method of claim 2 wherein dissolution of calcium sulfite is caused by sulfuric acid in an aqueous solution having a pH of between about 4 to 6.5.

4. The method of claim 3 wherein dissolution of calcium sulfite is caused by sulfuric acid in an aqueous solution having a pH of between 5.2 to 5.5.

5. The method of claim 3 wherein the calcium sulfite is contacted with from about 0.1 to about 0.5 mole sulfuric acid per mole calcium sulfite.

6. The method of claim 1 wherein the sludge containing the undissolved calcium sulfite is contacted with the aqueous media separated from the calcium sulfate precipitate.

7. The method of claim 6 wherein about 20 to 100 pounds of aqueous media, separated from the calcium sulfate precipitate, is recycled for every pound of calcium sulfite provided in the sludge from the flue gas desulfurization system.

8. The method of claim 1 wherein, a further minor portion of the slurry in the liquid scrubber unit is discharged therefrom at a pH of between about 4.5 to 6.0; contacted with sulfuric acid to cause dissolution of calcium sulfite contained therein; the dissolved calcium sulfite oxidized in the aqueous solution with an oxygen-containing gas to form calcium sulfate precipitate separated from the aqueous media.

9. The method of claim 8 wherein said further minor portion comprises about one-quarter to one-third of the total discharge from the scrubbing system.

10. In a method of flue gas desulfurization wherein a flue gas, containing sulfur dioxide, is contacted in a liquid scrubber unit with an aqueous slurry formed from calcium hydroxide and magnesium hydroxide, and which contains magnesium hydroxide in an amount to provide an effective magnesium ion content of between 2500 to 9000 parts per million in the liquid scrubbing unit, and at least a portion of the slurry, after passage through the scrubber, containing undissolved calcium sulfite is recirculated through a thickener to produce an aqueous sludge containing calcium sulfite, the improvement wherein the calcium sulfite present in the aqueous sludge is oxidized by:
    separating undissolved calcium sulfite, in a sludge which contains at least about 20 wieght percent solids, from the scrubbing slurry;
    contacting said sludge with aqueous sulfuric acid, in an aqueous solution having a pH of about 5.2 to 5.5, to cause dissolution of calcium sulfite in an aqueous solution;
    oxidizing the dissolved calcium sulfite in the aqueous sulfuric acid solution with an oxygen-containing gas to form a calcium sulfate precipitate in an aqueous media;
    separating the calcium sulfate precipitate from the aqueous media; and
    returning aqueous media, separated from the calcium sulfate precipitate, for contact with additional sludge produced in the thickener.

11. The method of claim 10 wherein the calcium sulfite is contacted with from about 0.1 to about 0.5 mole sulfuric acid per mole calcium sulfite, and about 20 to 100 pounds of aqueous media, separated from the calcium sulfate precipitate, is returned for every pound of calcium sulfite provided in the sludge from the flue gas desulfurization system.

12. The method of claim 11 wherein, a further minor portion of the slurry in the liquid scrubber unit, comprising about one-quarter to one-third of the total discharge from the scrubbing system, is discharged therefrom at a pH of between about 5.5 to 6.0; said further minor portion is contacted with an aqueous acid to cause dissolution of calcium sulfite contained therein; the dissolved calcium sulfite oxidized in the aqueous solution with an oxygen-containing gas to form calcium sulfate precipitate in an aqueous media; and the calcium sulfate precipitate separated from the aqueous media.

* * * * *